(12) United States Patent
Tomelleri

(10) Patent No.: US 6,985,792 B2
(45) Date of Patent: Jan. 10, 2006

(54) METHOD FOR AUTOMATICALLY CORRECTING THE SYSTEMATIC ERRORS IN MEASUREMENT AND MANUFACTURING MACHINES AND APPARATUS FOR IMPLEMENTING THE METHOD

(75) Inventor: Raffaele Tomelleri, Verona (IT)

(73) Assignee: FPT Industrie S.p.A., Camposampiero (IT)

( * ) Notice: Subject to any disclaimer, the term of this patent is extended or adjusted under 35 U.S.C. 154(b) by 0 days.

(21) Appl. No.: 10/489,309

(22) PCT Filed: Aug. 8, 2002

(86) PCT No.: PCT/EP02/08869

§ 371 (c)(1),
(2), (4) Date: Mar. 17, 2004

(87) PCT Pub. No.: WO01/07975

PCT Pub. Date: Feb. 1, 2001

(65) Prior Publication Data

US 2004/0254673 A1    Dec. 16, 2004

(30) Foreign Application Priority Data

Aug. 8, 2001 (IT) .......................... VE01A000036

(51) Int. Cl.
*G06F 19/00* (2006.01)
(52) U.S. Cl. ...................................... 700/176; 700/193
(58) Field of Classification Search ................ 700/176, 700/186, 193, 195
See application file for complete search history.

(56) References Cited

U.S. PATENT DOCUMENTS 4,352,778 A * 10/1982 Arnaud et al. .............. 376/365

(Continued)

FOREIGN PATENT DOCUMENTS

WO    WO 97/43703    11/1997

(Continued)

OTHER PUBLICATIONS

J.A. Soons, F.C. Theuws, P.H. Schellekns, "Modeling the errors of multi-axis machines: a general methodolgy," 1992, Precision Engineering, pp. 5-19.

(Continued)

*Primary Examiner*—Leo Picard
*Assistant Examiner*—Ryan A. Jarrett
(74) *Attorney, Agent, or Firm*—Hoffman Wasson & Gitler

(57) ABSTRACT

A method for automatically correcting the systematic errors in measurement machines and in manufacturing machines, in particular in machine tools, characterized by comprising the following operative steps in succession: identifying the parametric mathematical model of the machine, initially assigning, to the parameters of said parametric mathematical model, numerical values considered to be close to the effective values, to obtain a provisional mathematical model of the machine, effecting a plurality of mutually independent distance measurements within the working field of the machine, determining the differences between the experimentally measured distance values and the corresponding distance values deduced from said provisional mathematical model, to define the corresponding provisional inaccuracy index of the machine, varying said parameters in the sense of improving the predefined provisional inaccuracy index, to hence obtain a new provisional mathematical model of the machine which is closer to its definitive mathematical model, proceeding iteratively with new determinations of the difference between these and the corresponding values deduced from the mathematical model until said parameter variations do not produce any further significant improvement in said inaccuracy index, to hence obtain the definitive mathematical model of the machine, obtaining from said mathematical model the position and possibly orientation errors of the final machine member, and utilizing the error data to execute the correction.

24 Claims, 6 Drawing Sheets

U.S. PATENT DOCUMENTS 4,535,631 A * 8/1985 Sinha et al. .................. 73/703

FOREIGN PATENT DOCUMENTS

WO     WO 01/07975    *   2/2002

OTHER PUBLICATIONS

J. Mou, "A Method of Using Neural Networks and Inverse Kinematics for Machine Tools Error Estimation and Correction," May 1997, vol. 119, Journal of Manufacturing Science and Engineering, pp. 247-254.

* cited by examiner

METHOD FOR AUTOMATICALLY CORRECTING THE SYSTEMATIC ERRORS IN MEASUREMENT AND MANUFACTURING MACHINES AND APPARATUS FOR IMPLEMENTING THE METHOD

BACKGROUND OF THE INVENTION

This invention relates to a method for automatically correcting the systematic errors in measurement and manufacturing machines, which include machine tools and manipulators. The invention also relates to an apparatus for implementing the method.

Hereinafter, only machine tools will be considered for simplicity, however the same considerations with necessary adaptations are also valid for the other aforesaid machines.

In a machine tool the machining accuracy is known to depend on the precision of many elements along a path extending from the workpiece being machined and including the foundations, the machine itself and the tool, to form a ring which closes at the surface between the workpiece and the tool.

In a machine tool, the position of the tool relative to the workpiece is described by a theoretical mathematical model, hereinafter defined as the theoretical model, which provides the position and orientation of the tool in relation to the workpiece, on the basis of the position of the axes, assuming that no errors exist in the guide systems and that there is no structural yielding.

The theoretical model is complex to a greater or lesser extent, depending on the machine tool.

In the case of a paraxial machine with three axes, its theoretical model is very simple and consists essentially of three expressions, related to the reading of the respective axes.

$$X_1 = C_1 - Co_1$$

$$X_2 = C_2 - Co_2$$

$$X_3 = C_3 - Co_3$$

in which $X_i$ (i=1, 2, 3) are the real coordinates of the tool within the prechosen reference system, $C_i$ are the coordinates measured along the corresponding axes, and $Co_i$ are the zero positions.

With regard to the orientation of the spindle of a paraxial machine with three axes, the theoretical model provides constant angles.

On this basis, and focusing the description on a machine tool by way of example, the problem which this invention confronts and solves is to determine a mathematical model for said machine tool which is as close as possible to its real behaviour, to hence also take account of the causes of error, and to correct the consequent errors.

In a real machine tool the effective position and orientation of the tool in relation to the workpiece are a function of the position of each element relative to the position of the element which precedes it along the ring extending from the workpiece to the tool, so that the relative coordinates between the workpiece and tool and their relative orientation are a function of the reading of the machine axes, and also of many other quantities which take account of the errors present as far as possible.

In the case of a real machine tool with n axes in which many causes of error are present, with a determined applied tool its particular mathematical model is of type $$X'_1 = f_1(C_1, C_2, \ldots C_p \ldots C_n, V_1, V_2, \ldots V_i, \ldots V_l)$$

$$X'_2 = f_2(C_1, C_2, \ldots C_p \ldots C_n, V_1, V_2, \ldots V_i, \ldots V_l)$$

$$X'_3 = f_3(C_1, C_2, \ldots C_p \ldots C_n, V_1, V_2, \ldots V_i, \ldots V_l)$$

$$\alpha'_1 = g_1(C_1, C_2, \ldots C_p \ldots C_n, V_1, V_2, \ldots V_i, \ldots V_l)$$

$$\alpha'_2 = g_2(C_1, C_2, \ldots C_p \ldots C_n, V_1, V_2, \ldots V_i, \ldots V_l)$$

$$\alpha'_3 = g_3(C_1, C_2, \ldots C_p \ldots C_n, V_1, V_2, \ldots V_i, \ldots V_l)$$

in which $X_i$ are the coordinates of the tool base in relation to the workpiece, $C_i$ are the coordinates along the machine axes, $V_i$ are physical variables causing errors, such as temperature and load, $\alpha_i$ are the angles of orientation of the tool in relation to the workpiece, and $f_i$ and $g_i$ are functions of the machine mathematical model deriving from experience.

The aforestated expressions describe the position and orientation of the base of the final member, which in the case of a milling machine is the spindle cone.

The position and orientation of the final miller, consisting for example of the tool centre in the case of a spherical miller, can hence be deduced from the dimensions thereof in relation to the final member, i.e. from its three coordinates U, V, W, using the expressions:

$$X_1 = X'_1 + V^* \alpha_2 - W^* \alpha_3$$

$$X_2 = X'_2 + W^* \alpha_3 - U^* \alpha_1$$

$$X_3 = X'_3 + U^* \alpha_1 - V^* \alpha_2$$

$$\alpha'_1 = \alpha_1$$

$$\alpha'_2 = \alpha_2$$

$$\alpha'_3 = \alpha_3$$

obtaining that the position of the final point is always described by the following relationships which represent the mathematical model $$X_1 = f_1(C_1, C_2, \ldots C_p \ldots C_n, V_1, V_2, \ldots V_i, \ldots V_l, U, V, W)$$

$$X_2 = f_2(C_1, C_2, \ldots C_p \ldots C_n, V_1, V_2, \ldots V_i, \ldots V_l, U, V, W)$$

$$X_3 = f_3(C_1, C_2, \ldots C_p \ldots C_n, V_1, V_2, \ldots V_i, \ldots V_l, U, V, W)$$

$$\alpha_1 = g_1(C_1, C_2, \ldots C_p \ldots C_n, V_1, V_2, \ldots V_i, \ldots V_l, U, V, W)$$

$$\alpha_2 = g_2(C_1, C_2, \ldots C_p \ldots C_n, V_1, V_2, \ldots V_i, \ldots V_l, U, V, W)$$

$$\alpha_3 = g_3(C_1, C_2, \ldots C_p \ldots C_n, V_1, V_2, \ldots V_i, \ldots V_l, U, V, W)$$

For a generic machine tool, in which all the parameters of the functions which relate position and orientation to the axis coordinates and to the physical variables have not yet been identified, the mathematical model is of parametric type and will be known as a parametric mathematical model as it also comprises the parameters $P_i$, and assumes a form of type $$X_1 = f_1(C_1, C_2, \ldots C_p \ldots C_n, V_1, V_2, \ldots V_i, \ldots V_l, P_1, P_2, \ldots P_p \ldots P_m, U, V, W)$$

$$X_2 = f_2(C_1, C_2, \ldots C_p \ldots C_n, V_1, V_2, \ldots V_i, \ldots V_l, P_1, P_2, \ldots P_p \ldots P_m, U, V, W)$$

$$X_3 = f_3(C_1, C_2, \ldots C_p \ldots C_n, V_1, V_2, \ldots V_i, \ldots V_l, P_1, P_2, \ldots P_p \ldots P_m, U, V, W)$$

$$\alpha_1 = g_1(C_1, C_2, \ldots C_p \ldots C_n, V_1, V_2, \ldots V_i, \ldots V_l, P_1, P_2, \ldots P_p \ldots P_m, U, V, W)$$

$$\alpha_2 = g_2(C_1, C_2, \ldots C_b \ldots C_n, V_1, V_2, \ldots V_b \ldots V_b$$
$$P_1, P_2, \ldots P_b \ldots P_m, U, V, W)$$

$$\alpha_3 = g_3(C_1, C_2, \ldots C_b \ldots C_n, V_1, V_2, \ldots V_b \ldots V_b$$
$$P_1, P_2, \ldots P_b \ldots P_m, U, V, W)$$

in which $P_i(i=1, 2, 3 \ldots n)$ are m machine parameters, and U, V, W, are the tool dimensions.

When the parameters $P_i$ have been identified and hence have assumed precise numerical values, the group of six expressions becomes the mathematical model of the machine tool.

For evident reasons of machining accuracy it is essential that this mathematical model of the machine tool is as close as possible to the real system, and hence reduces to a minimum all errors resulting from any difference between the position and orientation of the tool relative to the workpiece, as calculated from the mathematical model, and its real position.

Such errors are the result of errors in the mathematical model, which describes all the relative positions of all the component elements of the ring as heretofore described. In the particular case of a machine tool with three axes, these errors are due to:

errors between the workpiece surface and the surface of the worktable, errors between the workpiece surface and the fixed reference system at the foundations, errors between the reference system and the movable structure of the first axis, errors between the movable structure of the first axis and the movable part of the second axis, errors between the movable structure of the second axis and the movable structure of the third axis, errors between the movable structure of the third axis and the head structure, errors between the head and the spindle bush, errors between the spindle bush and the tool cutting edge.

As the mathematical model of a machine tool is evidently more faithful the smaller the errors between the tool position indicated by the mathematical model and its real position, it is important that the parametric mathematical model contains, as far as possible, all the quantities and parameters which describe the position of the tool relative to the workpiece.

However, the more complicated the parametric mathematical model, the more difficult it is to define its parameter values and the more difficult it is to attain the desired precision.

In particular, identifying the mathematical model of the machine requires the use of instruments of various types (laser interferometers, electronic levels, etc.) which require continuous manual repositioning within the working field, with considerable time consumption.

Moreover the known correction systems do not enable the orientation of the final machine member to be corrected in relation to the errors provided by the mathematical model.

WO97/43703 already tackles the problem of automatically correcting the systematic errors in a machine tools, and solves it firstly by creating a parametric mathematical model of the machine tools and then by determining the numeric values of the single parameters, to obtain the mathematical model of the machine itself. According to this prior document, the determination of these parameters is obtained by submitting the parts of the machine to a series of movements and then of determining, by a series of measurements, the overall behaviour of the machine. These measurements comprise distance measurements carried out parallelly to the axes of the machine by means of laser interferometer but, in order to identify completely the mathematical model, they must be integrated by a series of measurements of other nature, carried out by specific apparatuses, such as telescopic ballbar, 5-D laser interferometer, spindle rotation error analyzer, dual-axis tilt analyzer, repeatability analyzer, autocollimator, compliance analyzer and spindle thermal growth analyzer. Consequently this method is very complex, it requires a lot of time (some months) for being carried out and also many instruments, by means of which skilled men can carry out a series of heteroaeneous measurements.

BRIEF SUMMARY OF THE INVENTION

An object of the invention is to propose a method which allows to create a mathematical model able to eliminate the drawbacks above mentioned. and in particular to create a model obtainable only by distance measurements, method which enables values as correct as possible to be automatically defined for the parameters of the mathematical model of a machine tool, in order to obtain a mathematical model in which the difference between the position and orientation of the tool relative to the workpiece as provided by the mathematical model, and the real position and orientation within the working field, is a minimum.

Another object of the invention is to implement correction of the position of the tool relative to the workpiece.

Another object of the invention is to implement correction of the orientation of the tool in relation to the workpiece, if the machine is provided with axes suitable to effect this correction, this being achieved by utilizing the difference between the orientation provided by the theoretical model and the orientation provided by the mathematical model.

Another object of the invention is to propose an apparatus for implementing the method.

These and other objects which will be apparent from the ensuing description are attained, according to the invention, by a method for correcting the systematic errors in measurement machines and in manufacturing machines, in particular in machine tools.

BREIF DESCRIPTION OF THE DRAWINGS

Two preferred practical embodiments of the invention are described in detail hereinafter with reference to the accompanying drawings, in which:

FIG. 1 is a general perspective view of a machine tool equipped with an apparatus for implementing the method of the invention, FIG. 2 is a side view of the calibration laser of the apparatus according to the invention, FIG. 3 is a plan view thereof on the line III—III of FIG. 2, FIG. 4 shows the laser reflector applied to the tool spindle of the machine tool, FIG. 5 shows schematically the system for pursuing said reflector, FIG. 6 is a longitudinal section through the triaxial laser of the apparatus according to the invention, FIG. 7 is a cross-section therethrough on the line VII—VII of FIG. 6, FIG. 8 shows the schematic block diagram of the apparatus of the invention, FIG. 9 shows the interface, taken on the line IX—IX of FIG. 10, between the machine and the support accessory for its final member, FIG. 10 is a partly sectioned side view thereof, FIG. 11 shows schematically the device for automatically fixing the accessory to the machine, FIG. 12 is an enlarged section on the line XII—XII of FIG. 13 showing a detail of the device for centering the accessory on the machine, and FIG. 13 is a section on the line XIII—XIII of FIG. 12.

DETAILED DESCRIPTION OF THE INVENTION

Before describing embodiments of the invention in detail, some definitions used during the course of the description will be given.

The term "machine" means a measurement machine or a manufacturing machine, which can be a machine tool or a manipulator.

The term "final machine member" means the member which is moved into all the positions and in all the directions corresponding to the degrees of freedom of the machine. In the case of a machine tool the final member is the tool or the tool holder head; in the case of a measurement machine it is the feeler; and in the case of a manipulator it is the gripper.

The term "dependent variables" means the coordinates and the angles of orientation of the final machine member in relation to the reference system used.

The term "independent variables" means the coordinates along the degrees of freedom of the machine, measured by the relative transducers, and the dimensional characteristics of the final member and other independent quantities (temperature, pressure, unitary loads) which influence the position of the final member and are measured by other specific transducers.

The term "parametric mathematical model" of the machine means the complex of relationships which link the independent variables to the dependent variables and to constant values not yet determined, but characteristic of the machine.

The term "parameters" means those constant values not yet determined, which characterise the relationships of the parametric mathematical model of the machine.

The term "mathematical model" of the machine means the parametric mathematical model after determining the parameters, i.e. after the parameters have been assigned the numerical values characteristic of the particular machine.

The term "particular mathematical model" means a mathematical model of a machine in which the tool has well defined dimensions.

The term "provisional mathematical model" of the machine means the mathematical model in which the parameters have been assigned provisional values.

The term "inaccuracy index" means an expression which is a function of all the measured errors (for example maximum error, standard deviation, etc.) and signifies the machine inaccuracy.

The method of the invention provides for carrying out the following operative steps in succession:

Definition of the Parametric Mathematical Model

A first step in the method of the invention provides for identifying for the machine that parametric mathematical model which is the most faithful possible, and which supplies the tool coordinates and possibly its orientation, on the basis of the position of the axes, the tool dimensions and the parameters.

Further independent variables represented by physical quantities such as temperatures and loads able to influence the tool position are then introduced into the parametric mathematical model.

Having defined the parametric mathematical model in the aforedescribed form, the invention provides for executing a plurality of mutually independent distance measurements between positions assumed by the tool within the working field. The distance measurements can include measurements of distance from a known geometrical spot, such as a sphere with different tool lengths and different orientations of the double rotatable head. The distance measurements are memorized.

Starting from a provisional mathematical model, the invention then provides for using the experimentally measured distance values and the corresponding distance values provided by said provisional mathematical model to obtain the best values to assign to the parameters in order to identify the mathematical model of the machine.

In particular the invention provides for:

initially assigning to said parameters numerical values considered close to the effective values, to obtain a provisional mathematical model for the machine, determining the differences between the experimentally measured distance values and the corresponding distance values deduced from said provisional mathematical model, to define the corresponding machine inaccuracy index, varying said machine parameters in the sense of reducing the value of its predefined inaccuracy index, proceeding with successive iterations until said parameter variations do not determine any further significant reduction in said inaccuracy index.

In order to further reduce said inaccuracy index the invention provides for augmenting said distance measurements with further measurements of real distances of a point on the final machine member from a predetermined geometrical spot physically present on the machine, and then comparing these further real distance measurements with those deduced from the provisional mathematical model.

Diagnosis

The values assigned to the parameters during the machine calibration step indicate the machine behaviour and hence provide useful information on the acceptability of the operating conditions.

Certification

The measurements effected within the machine working field for identifying the mathematical model also have the function of supplying the effective degree of machine precision achieved during the machining of the workpiece.

Correction

During machine operation, the tool position is deduced from the mathematical model identified in the calibration step and consequently the positioning precision becomes that of the mathematical model. On the basis of the tool position and orientation supplied by the mathematical model and by the position and orientation supplied by the theoretical model, the machine axes are corrected such that the tool position and orientation are as required.

To implement the method of the invention, distance measurements must be effected automatically between the different positions assumed by the tool within the machine working field, also using tools of different dimensions, then memorizing these measurements together with the axis coordinates and the other independent variables.

For this purpose the invention proposes to use two different apparatus, namely for effecting length or distance measurements and for effecting repeatability measurements.

The apparatus for effecting distance measurements consists of a fixed position laser interferometer and a laser reflector fixed to the tool spindle or to another movable part of the machine.

FIG. 1 shows overall a machine tool 2, to which the laser interferometer and the laser reflector are applied. More specifically, the laser interferometer of orientatable beam type, shown in FIGS. 2 and 3, comprises a laser source 4 mounted on the base 6 of a structure 8, provided also with a plate 10 which supports the orientation complex for a mirror 12. The plate 10 supports on bearings a fork element 14, the shank of which is driven by a first electric motor 16 provided with a rotation transducer (encoder) 18.

The two arms of the fork element 14 support, via bearings, a shaft 20 on which the mirror 12 is mounted to face the laser source 4. A second electric motor 22 is coupled to the shaft 20 to rotate it, a transducer 24 (encoder) measuring its rotations.

Four photodiodes 30 (see FIG. 5) are applied in four positions 90° apart to an annular element 26 surrounding the exit of the laser beam 28 from the source 4, and are connected to the electronic apparatus 32 which feeds the command signal to two amplifiers 34, 36 controlling the two electric motors 16, 22 respectively.

Instead of four sensors more could be used, for example eight in order to obtain greater precision in correcting the orientation of the laser beam.

The laser reflector consists essentially of a cube-vertexed catadioptric reflector 38, which has the known property of reflecting an incident beam 28 in a direction parallel to itself, while the incident angle is contained within a cone with an opening angle of about 35° to the axis of the reflector 38.

To effect the distance measurements, i.e. to define the real positions of the final machine member, in the specific case of the tool of a machine tool 2, the structure 8 is positioned in a fixed position relative to the base 40 of said machine, the reflector 38 is applied to the tool or to the tool spindle 42, and the laser beam 28 emitted by the source 4 and reflected by the mirror 12 is made to strike the reflector 38 and be reflected rearwards by the mirror 12 and into the interior of the annular element supporting the photodiodes 30.

Once the spindle 42 of the machine tool 2 has been "linked" in this manner to the calibration laser, it remains always linked to it, by virtue of the apparatus software which processes the signals originating from the photodiodes 30 sensitized by the laser beam reflected by the reflector 38 and deviated by the mirror 12, and transforms them into signals which control the two motors 16 and 22, such as to return the reflected beam into the interior of the annular element 26.

In this manner, the laser interferometer is able to effect distance measurements between pairs of positions successively occupied by the reflector 38, and hence by the tool of the machine, following successive movements of the tool under the control of the numerical control system along one and the same direction, without any operator intervention.

On termination of this series of measurements the apparatus orientates the laser beam differently so that it always maintains the tool linked to itself, and executes a new series of distance measurements along a new direction programmed by the numerical control system.

After a first series of distance measurements in accordance with several orientations, the position and orientation of the calibration laser are completely identified, with reference to the positions assumed by the axes, and are transmitted by the numerical control system to the apparatus, which is able to orientate the mirror 12 with the necessary angles, by closed-cycle control of the motors of the encoders of the two axes.

It should be noted that possible small orientation errors, corresponding to a few millimetres on the reflector 38, do not influence the distance when this is of the order of at least one meter.

On termination of these distance measurements along all the programmed directions, the structure 8 can be moved manually and the same operations repeated in order to acquire further distance measurement data in one or more directions. With these data the apparatus is able to effect comparisons between the real distances supplied by the laser interferometer and the corresponding theoretical distances supplied by the numerical control system, and then proceed to identify the mathematical model for the machine.

The second apparatus of the invention is particularly suitable for modelling the double rotatable heads, i.e. for determining the characteristic parameters such that the final point can repeat the same position with maximum precision as the head assumes all possible orientations.

It consists of a triaxial sensor able to effect repeatability measurements in different positions with a tool of spherical shape, always returned to the same position for different orientations of the tool spindle, indicating the three error components in the three directions of the coordinate axes.

The triaxial sensor of the apparatus according to the invention (see FIGS. 6 and 7) comprises a support 44 supporting a rotary shaft 46 driven by an electric motor 48 able to move it into two separate positions 180° apart when a key 50, rigid with said shaft 46, interferes with one or other of two stops 52, 54 rigid with a sleeve 56 fixed to the shaft.

The ability to assume two different orientations enables interference with the sphere and with its supporting shaft to be avoided.

The principle of operation of the described triaxial sensor is based on the aim of determining the distance between a point on the tool (for example the centre of a sphere 58 representative of the tool) and a point in space, defined by three proximity sensors 60 disposed in the three spatial directions. The sense of this determination is linked to the fact that if a point on the tool has to reach the machined workpiece from different directions and with different orientations, its centre must always return to the same position represented by the centre of the sphere 58.

In the ideal case this centre of the sphere 58 must coincide with that point in space defined by the three proximity sensors 60, whereas in reality this does not happen because of the errors introduced by the machine.

For this reason it is necessary to create a mathematical model, not only of the machine but also of the double rotational head, which takes account of the errors introduced in practice, this model being created starting from a parametric mathematical model in which the values of the parameters are fixed during the calibration step.

To achieve this, the sphere 58 is made to approach the three proximity sensors 60 while trying to make its centre coincide with the point in space determined by these.

The positioning of the sphere at the same point is then repeated, but with different angles of the head axes, while memorizing at each positioning the position error supplied by the three sensors 60.

The measurement is obtained by averaging the two measurements with the spindle 42 in two positions at 180° apart, so that the measurement is not influenced by the form errors of the spindle and sphere support.

The measurement is repeated with different combinations of head angles and is then repeated with a different tool length, so that the measurements are not influenced by the position of the axis of rotation of the spindle 42.

The same procedure could be followed if the geometrical spot, with respect to which the distance from a point on the tool has to be measured, is for example a plane instead of an ideal point in space. For this purpose a real plane of the machine could be used and the distance of the tool therefrom measured by applying a proximity sensor to the tool holder and effecting a series of distance measurements with different tool positions and orientations.

As stated, the total of effected measurements and processings enables automatic determination of the correct parameters which identify the mathematical model for the machine, together with an inaccuracy index therefor. And as the machine is able to automatically determine its inaccuracy index it can be stated that the method and apparatus of the invention enable the machine to self-certify its quality.

During the calibration step, the electronic apparatus, represented in FIG. 8, receives data from the calibration laser, from the triaxial sensor and from the numerical control system in such a manner as to identify the mathematical model.

During machine operation, the electronic apparatus feeds to the numerical control system, on the basis of the position of the axes, which represent the required positions of the tool by means of the machine theoretical model, and on the basis of any physical quantities, those corrections to be made to the machine axes to obtain the desired position and possibly also the desired orientation of the tool.

Given the machine mathematical model:

$$X_1=f_1(C_1, C_2, \ldots C_p \ldots C_n, V_1, V_2, \ldots V_p \ldots V_b U, V, W)$$

$$X_2=f_2(C_1, C_2, \ldots C_p \ldots C_n, V_1, V_2, \ldots V_p \ldots V_b U, V, W)$$

$$X_3=f_3(C_1, C_2, \ldots C_p \ldots C_n, V_1, V_2, \ldots V_p \ldots V_b U, V, W)$$

$$\alpha_1=g_1(C_1, C_2, \ldots C_p \ldots C_n, V_1, V_2, \ldots V_p \ldots V_b U, V, W)$$

$$\alpha_2=g_2(C_1, C_2, \ldots C_p \ldots C_n, V_1, V_2, \ldots V_p \ldots V_b U, V, W)$$

$$\alpha_3=g_3(C_1, C_2, \ldots C_p \ldots C_n, V_1, V_2, \ldots V_p \ldots V_b U, V, W)$$

and the machine theoretical model which is represented as follows:

$$Xa_1=fa_1(C_1, C_2, C_p \ldots C_n)$$

$$Xa_2=fa_2(C_1, C_2, C_p \ldots C_n)$$

$$Xa_3=fa_3(C_1, C_2, C_p \ldots C_n)$$

$$\alpha a_1=ga_1(C_1, C_2, C_p \ldots C_n)$$

$$\alpha a_2=ga_2(C_1, C_2, C_p \ldots C_n)$$

$$\alpha a_3=ga_3(C_1, C_2, C_p \ldots C_n)$$

the magnitude of the position corrections to feed to the numerical control system are given by the differences $$ex_1=X_1-Xa_1$$

$$ex_2=X_2-Xa_2$$

$$ex_3=X_3-Xa_3$$

$$e\alpha_1=\alpha_1-\alpha a_1$$

$$e\alpha_2=\alpha_2-\alpha a_2$$

$$e\alpha_3=\alpha_3-\alpha a_3$$

which are achieved in the numerical control system, by manipulating the axes in accordance with the theoretical mathematical model, given that the errors in the magnitude of the correction are negligible.

If the tool orientation is to be corrected, the machine must allow manipulations able to modify the tool orientation, which can be achieved via the same axes as the double rotational head, with which the machine is already provided, or via supplementary axes, added precisely to achieve said correction.

FIG. 9 shows the saddle of a milling machine with movable column, provided with four devices for automatically fixing the support head 62 for the spindle 42 and two conical positioning pegs 64.

Figure 1:
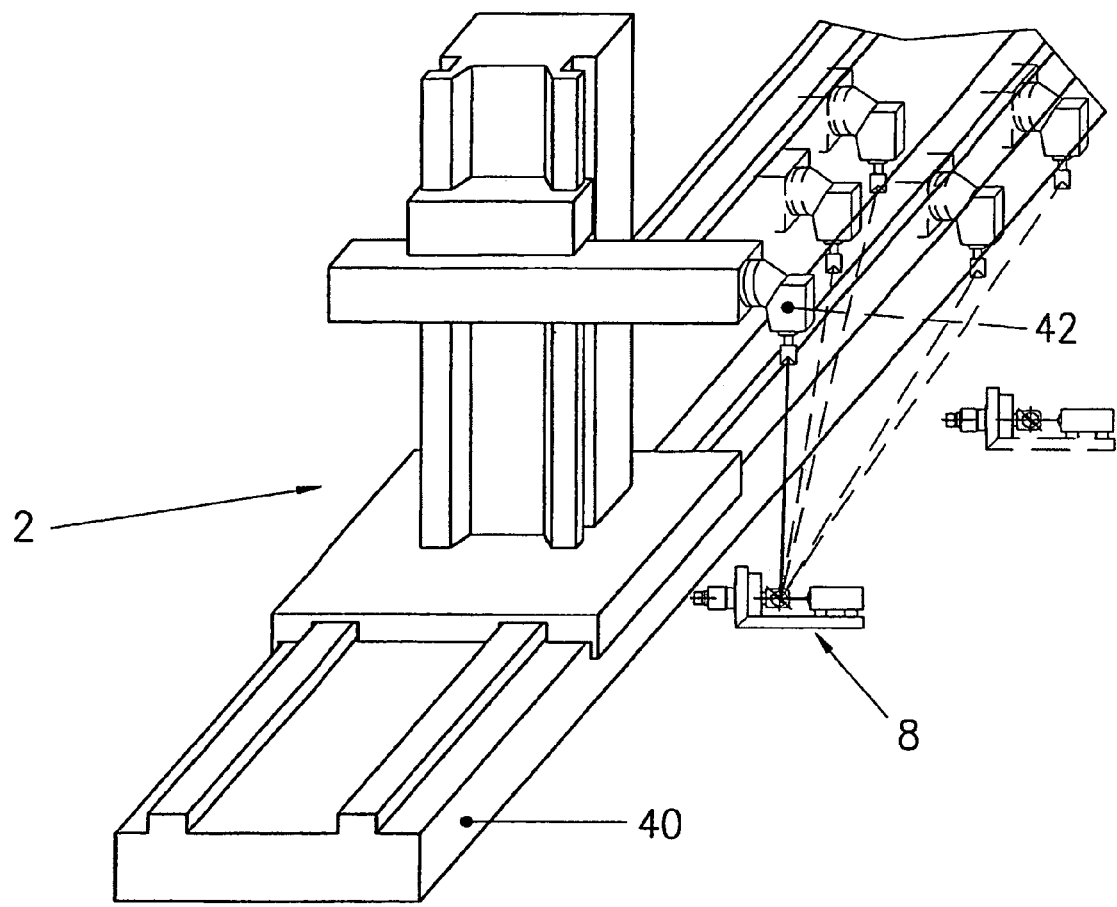
Figure 2:
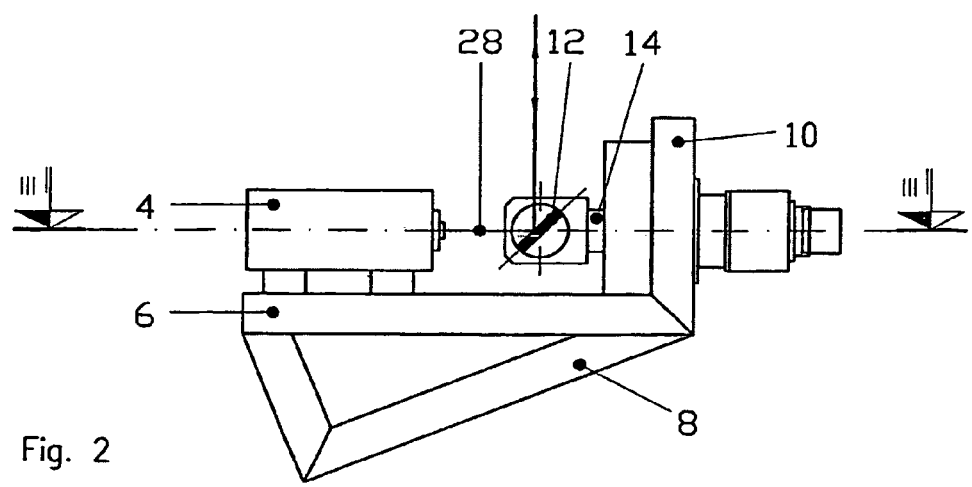
Figure 3:
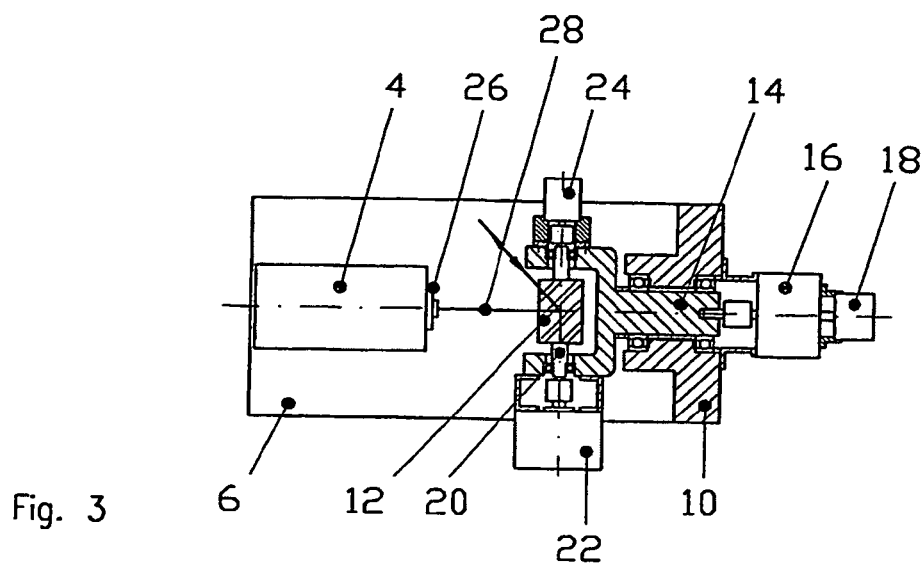
Figure 4:
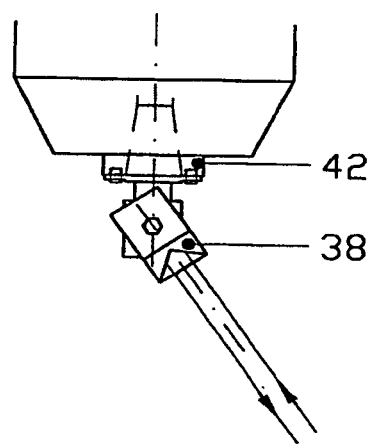
Figure 5:
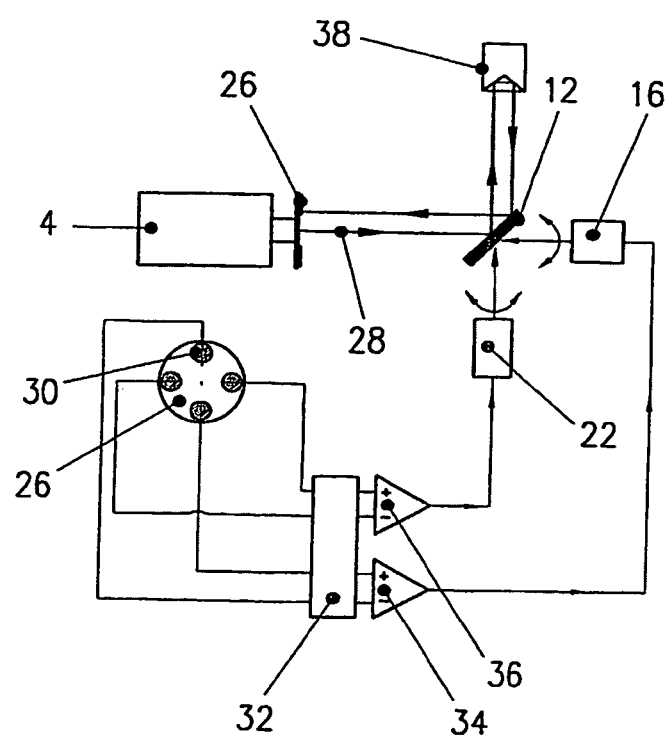
Figure 6:
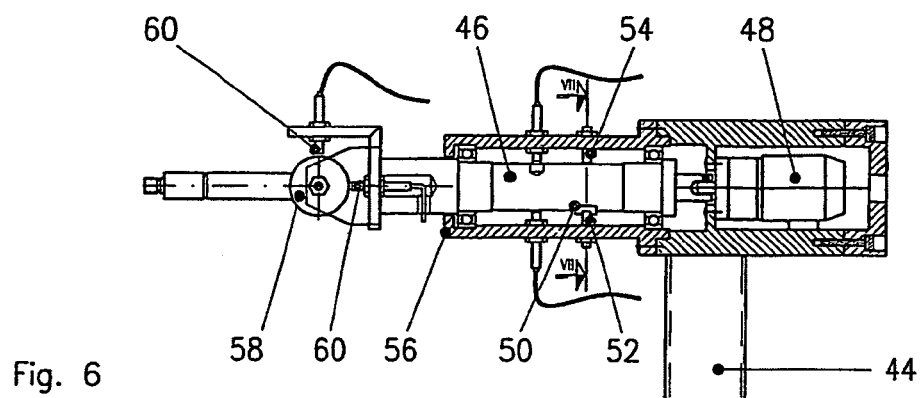
Figure 7:
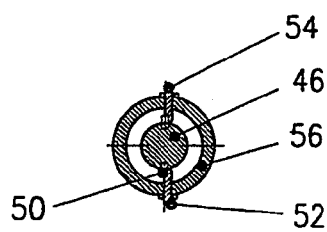
Figure 8:
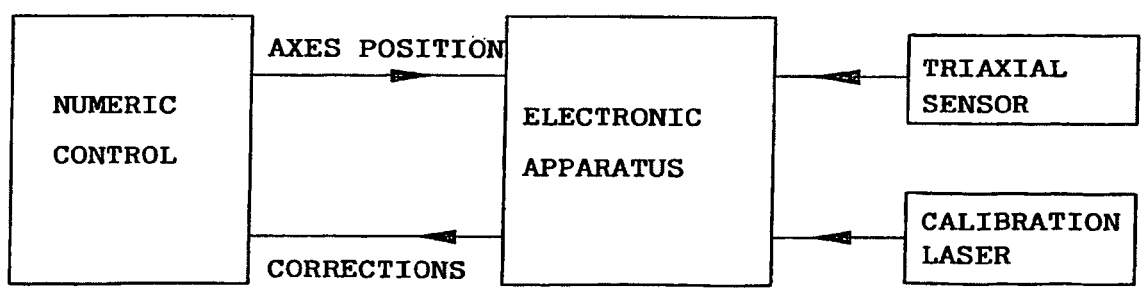

Each automatic fixing device comprises a locking gripper 66, of traditional type, operated by a piston 68 slidable within a cylindrical seat 70 provided within the part 72 by which the fixing device is securely applied to the saddle 74 of the machine tool. The locking gripper 66 of each fixing device cooperates with a stem, also of traditional type, applied to the support head 62 for the spindle 42.

The part 72 of each fixing device extends beyond that surface of the saddle 74 facing the head 62 with an annular portion 78 deformable by compression following traction exerted on it by the fixing device when the operative fluid is fed is under pressure into the cylinders 70.

By this ability of the portion 78 of each fixing device to deform by compression, the size of the gap 80 between the face of the saddle 74 and the support head 62 for the tool spindle 42, and consequently the position of the bearing point 82 of said head 62, can be varied.

From the required orientation of the head 62 for the spindle 42, the yielding necessary at the position of the bearing point of each of the four fixing devices for its support head 62 can be determined, with consequent determination of the pressures necessary in the four cylinders 70.

Figure 9:
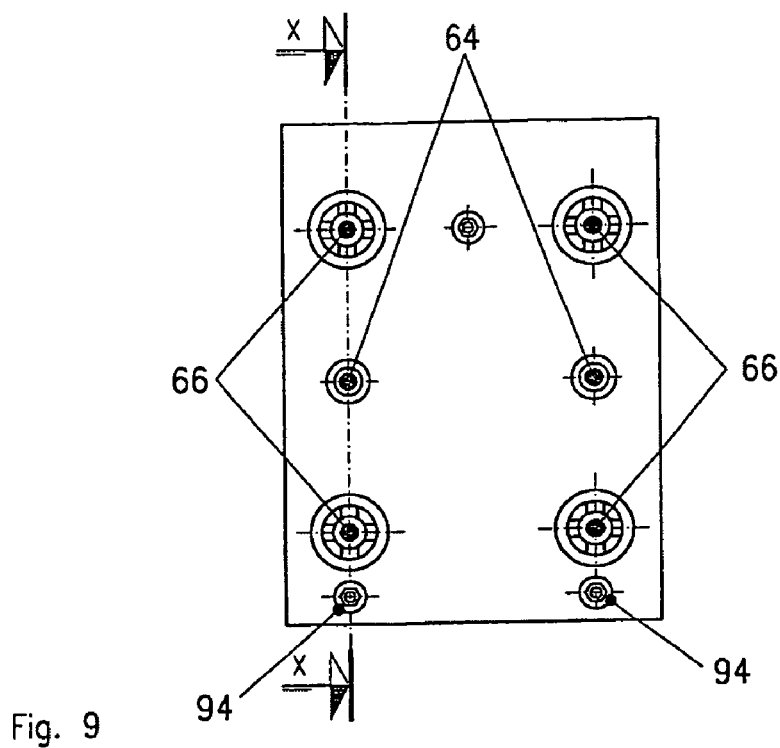
Figure 10:
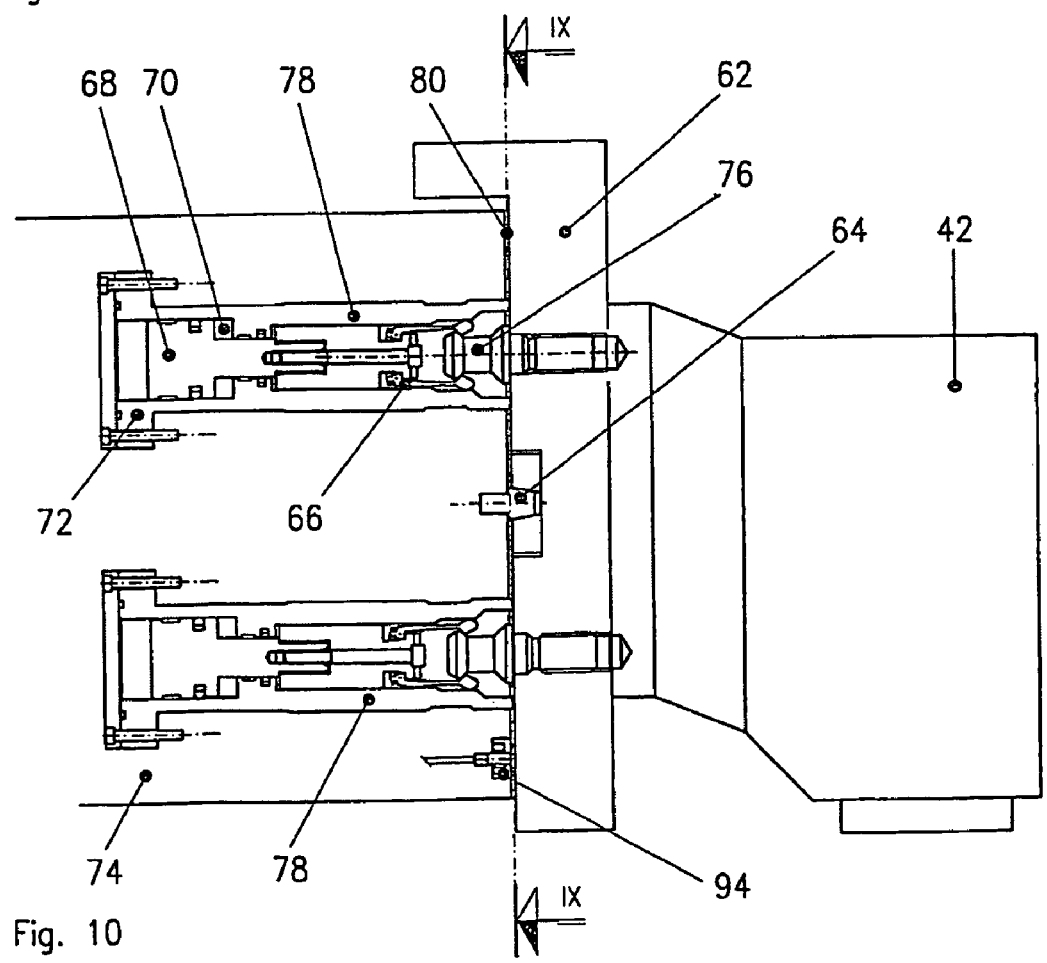
FIG. 10 is a side view of the automatic fixing devices for the accessories.
Figure 11:
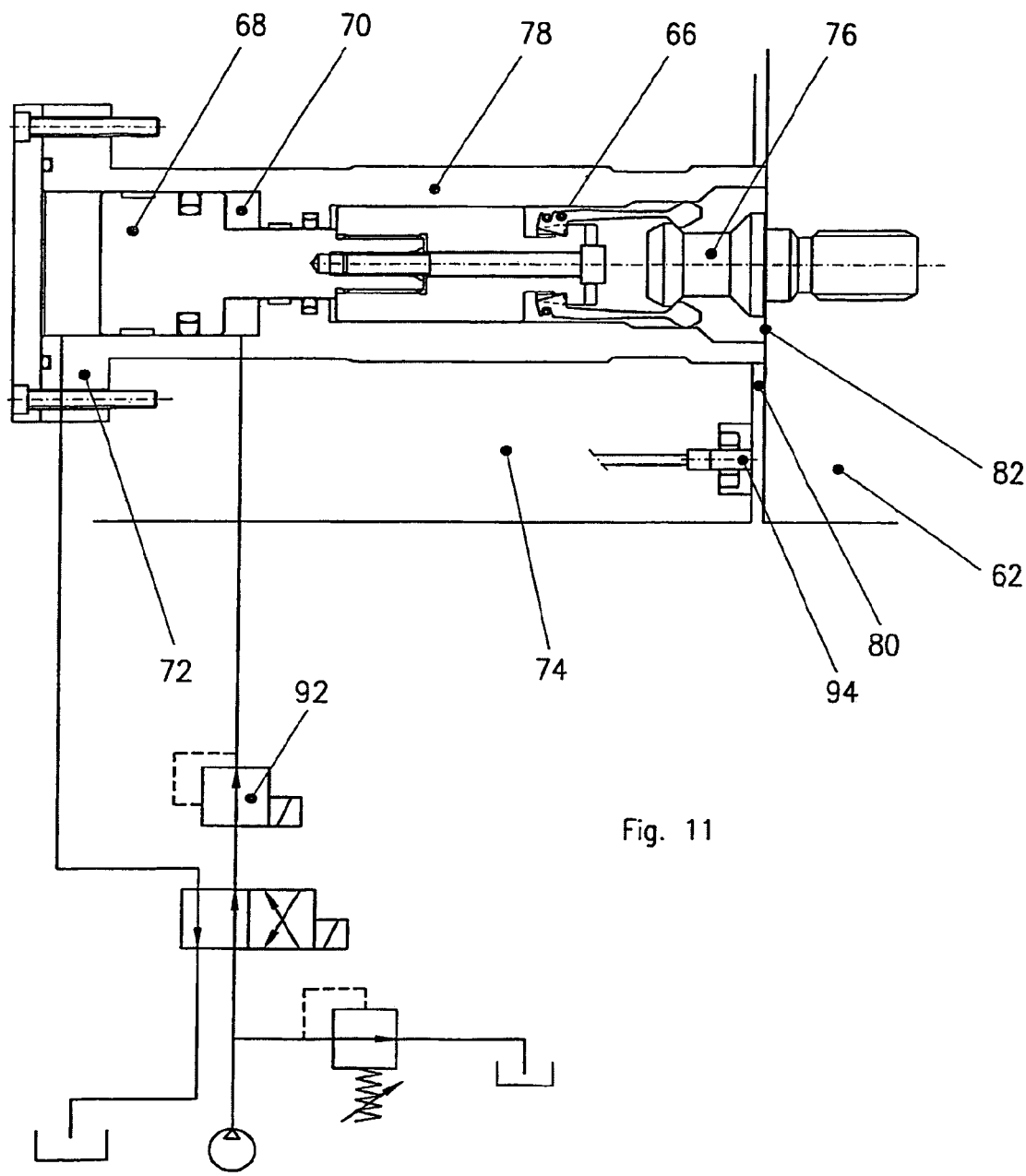
FIG. 11 shows a possible embodiment of the automatic fixing devices for the head 62.

The solution presented by FIGS. 9, 10 and 11 enables the orientation of the head 62 to be modified by rotations $\square_1$ and $\square_3$ about the x and z axes, without appreciable errors in the position of the head 62 with respect to the saddle, provided the conicity of the conical pegs is sufficiently small.

If it is required to also introduce the rotation $\alpha_2$, this is certainly possible seeing that the saddle fixing position has three degrees of freedom, hence having utilized the two rotations of the base of the head, there remains the possibility of utilizing the head translation to achieve the remaining rotation. This can be effected by transforming the translations along the y axis into a rotation about the same axis with a cam.

Figure 12:
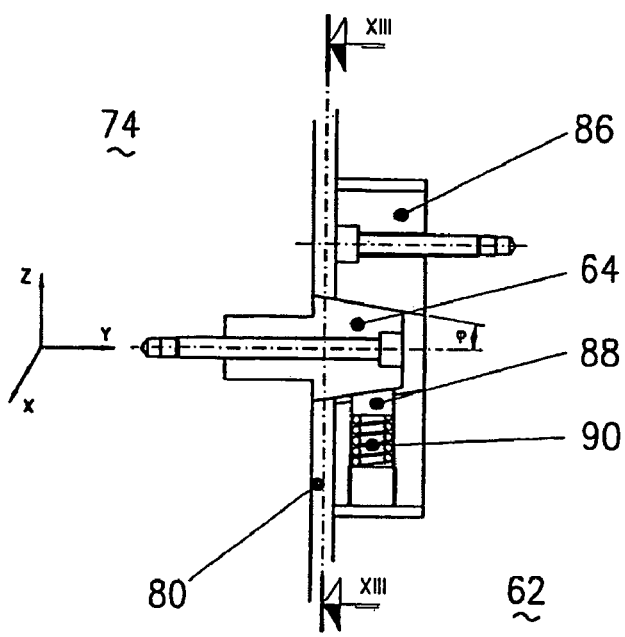
Figure 13:
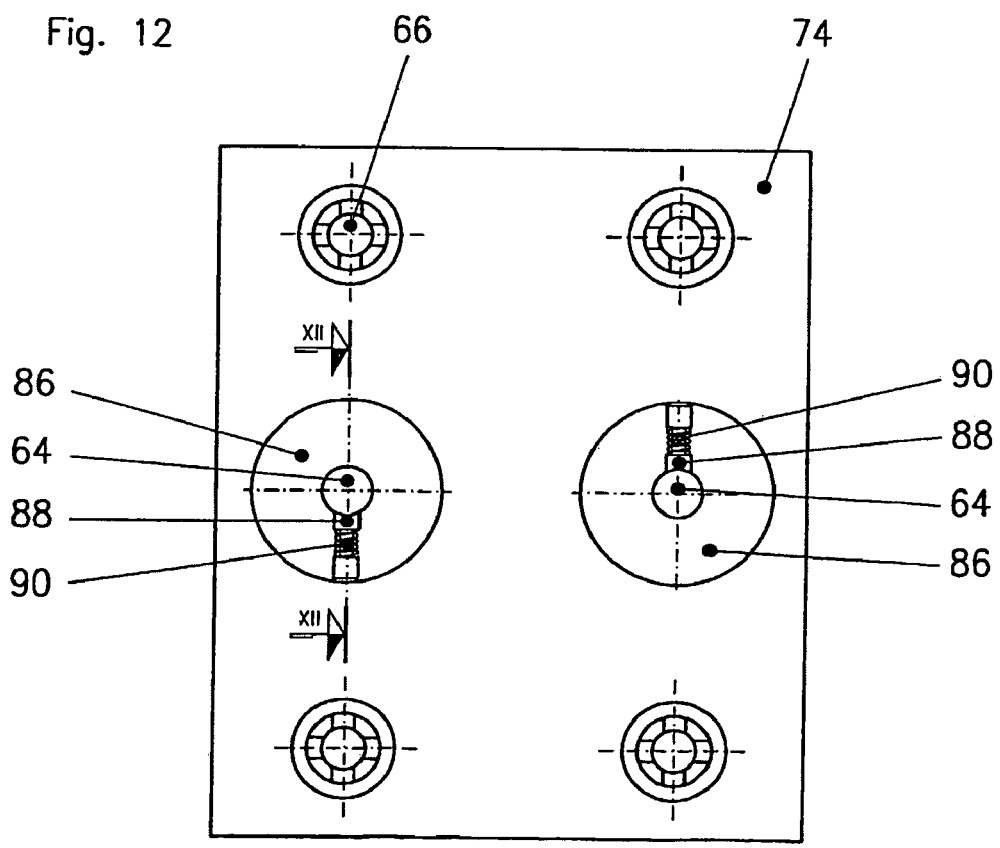

FIG. 12 shows the saddle 74, to which two conical pegs 64 are fixed. To each of the conical pegs there is coupled a bush 86, which rests against the conical peg in its upper part, whereas in its lower part it is opposed by an element 88 urged by a spring 90 of suitable force to ensure its resting on the other side. FIG. 13 shows the two conical pegs 64, in which one of the two elements 88 is directed downwards and the other is directed upwards. In this manner it is apparent that for an overall translation of the head 62 its rotation about the y axis is obtained. The presented solution enables the head 62 to be orientated during the finishing operations, whereas during roughing operations the head 62 is brought to bear on the surface of the saddle 74 with adequate fixing device force.

The feed pressure is piloted by a proportional pressure reducing valve 92, whereas the effective position of the head 62 in relation to the surface of the saddle 74 is controlled by proximity sensors 94.

If the orientation correction device is present in the machine, the correction step provides for executing the following operations in the given order.

1. On the basis of the tool orientation supplied by the mathematical model, and of the desired theoretical orientation, the necessary orientation corrections to be effected on the correction device are calculated and these corrections are made.

$$e\alpha_1 = \alpha_1 - \alpha a_1$$

$$e\alpha_2 = \alpha_2 - \alpha a_2$$

$$e\alpha_3 = \alpha_3 - \alpha a_3$$

2. On the basis of the tool position supplied by the mathematical model, and of the theoretical position, the position corrections for the axes are calculated.

$$ex_1 = X_1 - Xa_1$$

$$ex_2 = X_2 - Xa_2$$

$$ex_3 = X_3 - Xa_3$$

3. The translations induced by the orientation corrections on the tool are calculated on the basis of the distances X, Y, Z between the axes of rotation of the corrections and of the tool position.

$$\Delta X_1 = Y^* e\alpha_3 - Z^* e\alpha_2$$

$$\Delta X_2 = Z^* e\alpha_1 - X^* e\alpha_3$$

$$\Delta X_3 = X^* e\alpha_2 - Y^* e\alpha_1$$

4. The positions of the axes are corrected taking account of the translations induced by the orientation corrections.

$$ex_1 = X_1 - Xa_1 - \Delta X_1$$

$$eX_2 = X_2 - Xa_2 - \Delta X_2$$

$$eX_3 = X_3 - Xa_3 - \Delta X_3$$

If it is desired to make the acquisition of distance measurements in the various positions assumed by the laser interferometer of orientatable beam type even more automatic, the machine itself can be used to transport the laser from one position to the other, using for example the tool automatic locking device.

It is advisable that the number of measurements made for identifying the mathematical model be sufficiently high, and able to discriminate all the causes of error present in the model.

Moreover, to identify the mathematical model, which is a function of the tool dimensions U, V, W, distance measurements must be made with at least three separate tools, of different dimensions, which are not a linear combination of the other two, unless the rotations $\alpha_1, \alpha_2, \alpha_3$ are so small that the dimensions U, V, W, produce only a translation of the tool centre.

If modelling a hexapod, in which the rotations of the final member are not negligible, measurement with different dimensions of the final member is instead necessary.

What is claimed is:

1. A method for automatically correcting systematic errors in measurement machines and in manufacturing machines equipped with a final machine member, comprising:
    identifying a parametric mathematical model of the machine,
    initially assigning, to the parameters of said parametric mathematical model, numerical values considered to be close to the actual values, thus obtaining a provisional mathematical model of the machine,
    performing a plurality of mutually independent experimental distance measurements, within the working field of the machine in various directions, a majority of which are not parallel to the axis of the machine, thus producing experimentally measured distance values,
    determining possible differences between the experimentally measured distance values and corresponding distance values deduced from said provisional mathematical model, to define a corresponding provisional inaccuracy index of the machine,
    varying said numerical values assigned to said parameters in the sense of improving the predefined provisional inaccuracy index, to hence obtain a new provisional mathematical model of the machine which is closer to a final mathematical model of the machine,
    if the improved inaccuracy index so obtained is not satisfactory, proceeding iteratively with new determinations of the differences between the experimentally measured distance values and the corresponding distance values deduced from said provisional mathematical model until said parameter variations do not produce any further significant improvement in said inaccuracy index, to hence obtain the mathematical model of the machine,
    obtaining from said mathematical model the position errors of the final machine member and, if the machine has rotation freedom degrees of said final member, also its orientation errors, and
    providing a numerical control system with the error data to execute the correction.

2. A method as claimed in claim 1, further comprising defining said provisional inaccuracy index of the machine as maximum value among all of said differences and by varying said parameters in the sense of annulling them.

3. A method as claimed in claim 1, further comprising performing said distance measurements between separate positions assumed by the final machine member, using a laser interferometer.

4. A method as claimed in claim 2 further comprising preforming the distance measurements using a laser interferometer of automatically orientatable type.

5. A method as claimed in claim 4, further comprising performing the distance measurements using a laser interferometer of automatically orientatable type towards a reflector fixed to the final machine member.

6. A method as claimed in claim 1, further comprising performing said distance measurements between a point on the final machine member and a predetermined geometrical spot.

7. A method as claimed in claim 1, further comprising performing distance measurements from a fixed point representative of the final machine member, in three mutually perpendicular directions.

8. An apparatus for implementing the method claimed in claim 1, further comprising:
measurement means, associated with the machine, for performing, under different machine operating conditions, distance measurements between two points on the machine in various directions a majority of which are not parallel to the axis of the machine, in order to produce a plurality of independent distance measurements,
a processing unit provided with means for assigning numerical values to said parameters of the parametric mathematical model, means for determining distances using said provisional mathematical model, means for comparing the distance values determined in this manner with said distance measurements to produce error data, and means for transmitting the error data from said comparison means to a numerical control system and to the machine.

9. An apparatus as claimed in claim 8 further comprising:
a reflector applied to the final member of the machine,
a laser interferometer, the beam of which is automatically orientatable towards the reflector,
processing means, which during the distance measurement step orientate the laser beam towards the reflector, during the mathematical model identification step assign the best values to the parameters, and during the correction step acquire the error data and transmit them to the numerical control system.

10. An apparatus as claimed in claim 9 further comprising a mirror facing the interferometer, to reflect the beam emitted thereby, towards the reflector and to also reflect towards said laser interferometer the beam reflected by said reflector, with said mirror there being associated means for its manipulation in the sense of ensuring that the reflected beam originating from said reflector strikes said laser interferometer independently of the position of said reflector.

11. An apparatus as claimed in claim 10 wherein the mirror is supported by a support with two mutually perpendicular rotating arms connected to respective actuators operated under the control of sensors associated with said laser interferometer.

12. An apparatus as claimed in claim 11, wherein each of said actuators consists of an electric motor provided with an angular transducer and controlled by said sensors, which are located on an annular element provided in said interferometer in a position surrounding the exit of said laser beam.

13. An apparatus as claimed in claim 8, further comprising a triaxial device for measuring distance from a fixed point.

14. An apparatus as claimed in claim 13, wherein said triaxial device comprises a sphere fixed in place of the final machine member, and three fixed sensors which measure the distance from said sphere in the three directions of said sensors.

15. An apparatus as claimed in claim 13, wherein said triaxial device comprises a fixed sphere and three sensors fixed in place of the final machine member, to measure the distance from said sphere in the three directions of said sensors.

16. An apparatus as claimed in claim 13, wherein the three sensors are rotary and of type suitable to each assume at least two separate positions.

17. An apparatus as claimed in claim 8, further comprising, for correcting the orientation of the final machine member, means consisting of a devices for fixing a support head for said final machine member to the a machine saddle.

18. An apparatus as claimed in claim 17, further comprising, in addition to said fixing devices, at least one conical peg for positioning said head.

19. An apparatus as claimed in claim 17, wherein each fixing device is mounted on the machine saddle and comprises a locking gripper cooperating with a stem fixed to the support head for the final machine member, said locking gripper being associated with a hydraulic piston able to exert on command an axial traction on said stem, acting against a deformable part present between said saddle and said head.

20. An apparatus as claimed in claim 19, wherein sensors are interposed between the saddle and the support head for the final machine member, for monitoring their mutual position.

21. An apparatus as claimed in claim 20, further comprising several individually controllable fixing devices exerting different tractions on the corresponding stems such as to induce rotations of said head with respect to said saddle about mutually perpendicular axes parallel to the surface of said saddle facing said head.

22. An apparatus as claimed in claim 18, wherein with the conical seat housing said conical peg there is associated a pusher acting on the lateral conical surface of said peg to ensure stability of the connection independently of its axial position in the respective seat.

23. An apparatus as claimed in claim 22, wherein elastic means are associated with said pusher to maintain it adhering to said conical peg.

24. An apparatus as claimed in claim 22, further comprising two spacedapart conical pegs each provided, in its respective housing seat, with a pusher acting in the opposite direction to the other peg to induce, on the basis of the axial position of each peg in its respective seat, a rotation of said head with respect to said saddle about an axis perpendicular to that surface of said saddle facing the head.

* * * * *